United States Patent
Nayfeh

(10) Patent No.: US 8,549,141 B1
(45) Date of Patent: *Oct. 1, 2013

(54) USER TRACKING WITHOUT UNIQUE USER IDENTIFIERS

(75) Inventor: Basem Nayfeh, Mercer Island, WA (US)

(73) Assignee: AudienceScience Inc., Bellevue, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/344,555

(22) Filed: Jan. 5, 2012

Related U.S. Application Data

(63) Continuation of application No. 10/830,870, filed on Apr. 23, 2004, now Pat. No. 8,131,837.

(60) Provisional application No. 60/560,996, filed on Apr. 9, 2004, provisional application No. 60/520,141, filed on Nov. 13, 2003.

(51) Int. Cl.
*G06F 15/173* (2006.01)

(52) U.S. Cl.
USPC ........... 709/224; 709/203; 709/217; 709/219; 709/223

(58) Field of Classification Search
USPC ........................................................ 709/224
See application file for complete search history.

(56) References Cited

U.S. PATENT DOCUMENTS

| | | | |
|---|---|---|---|
| 6,018,619 A | 1/2000 | Allard et al. | |
| 6,366,956 B1 | 4/2002 | Krishnan | |
| 6,460,036 B1 | 10/2002 | Herz | |
| 6,873,982 B1 | 3/2005 | Bates et al. | |
| 6,968,315 B1 | 11/2005 | Nakisa | |
| 7,039,699 B1 | 5/2006 | Narin et al. | |
| 7,062,561 B1 | 6/2006 | Reisman | |
| 2002/0046105 A1 | 4/2002 | Gardenswartz et al. | |
| 2002/0078192 A1 | 6/2002 | Kopsell et al. | |
| 2003/0051033 A1 | 3/2003 | Kusumoto et al. | |
| 2004/0064443 A1* | 4/2004 | Taniguchi et al. | 707/3 |
| 2004/0225553 A1 | 11/2004 | Broady et al. | |

* cited by examiner

*Primary Examiner* — Jerry Dennison
*Assistant Examiner* — Adam Cooney
(74) *Attorney, Agent, or Firm* — Perkins Coie LLP

(57) ABSTRACT

A computer memory attached to a user computer system that is used by a user is described. The memory contains an advertising characterization data structure that can be used to select advertising for the user. The data structure contains a identifier passed to the user computer system by a remote computer system. The identifier is mapped by a dictionary that is resident on the remote computer system to a set of actions performed by the user.

20 Claims, 6 Drawing Sheets

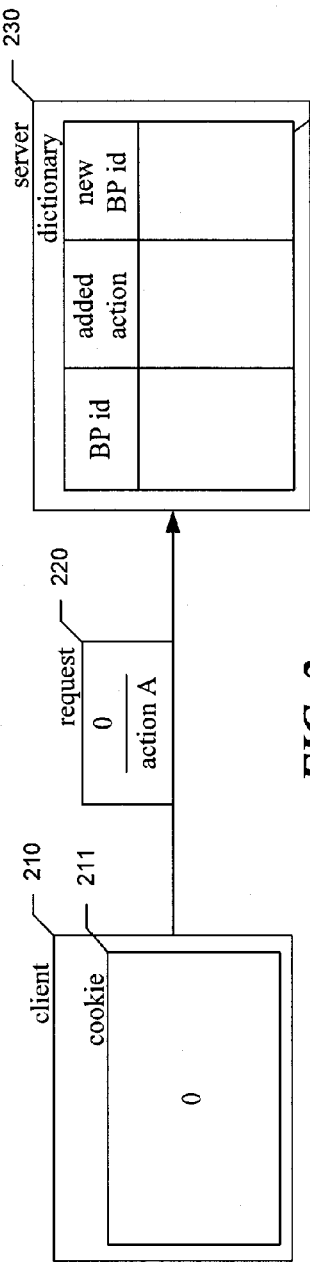
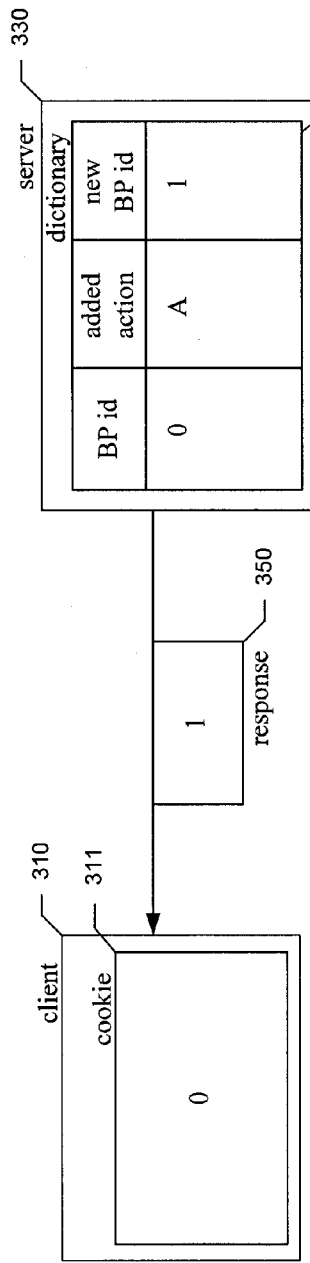
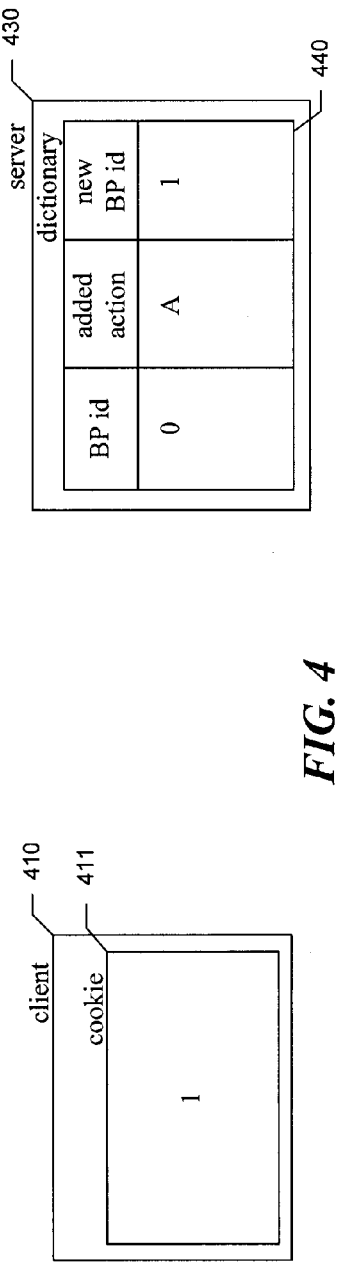
FIG. 2
FIG. 3
FIG. 4

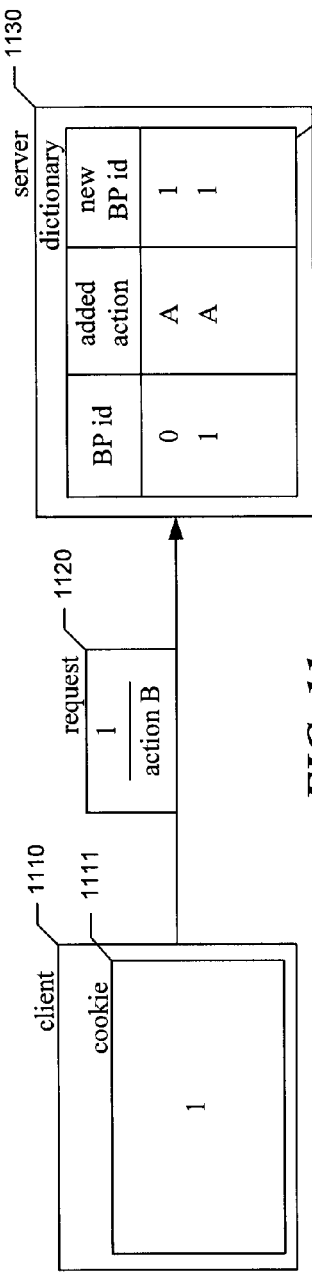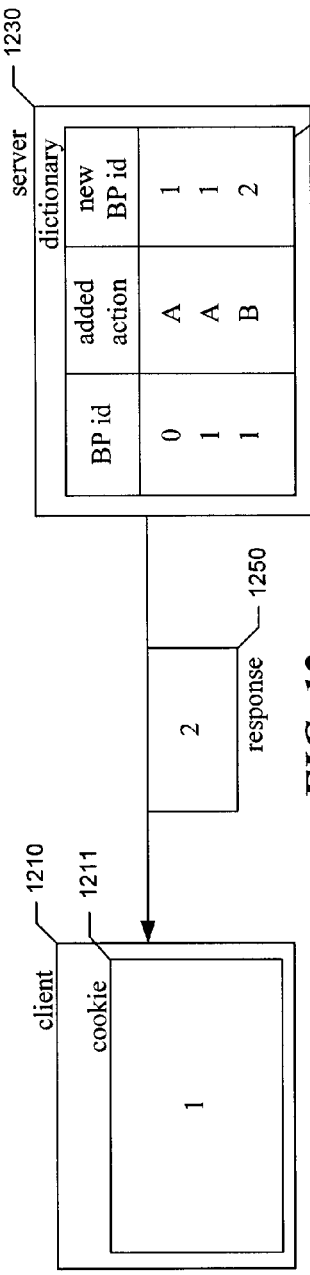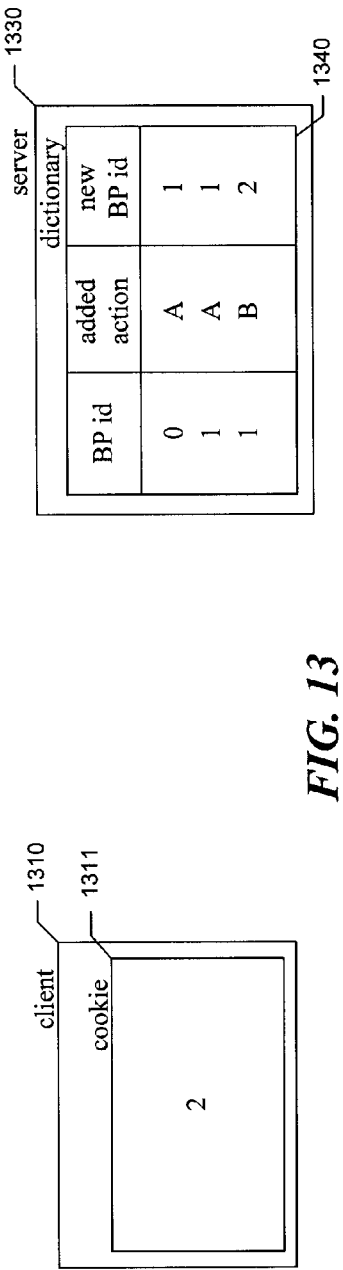

USER TRACKING WITHOUT UNIQUE USER IDENTIFIERS

CROSS-REFERENCE TO RELATED APPLICATION(S)

This application is a continuation of U.S. patent application Ser. No. 10/830,870, entitled "User Tracking Without Unique User Identifiers," filed on Apr. 23, 2004, which application claims the benefit of U.S. Provisional Application No. 60/560,996, entitled "User Tracking Without Unique User Identifiers" and filed on Apr. 9, 2004, which are hereby incorporated by reference in their entirety. This application is related to the following applications: U.S. Patent Application No. 60/520,141, filed on Nov. 13, 2003; U.S. application Ser. No. 10/653,703, filed on Sep. 2, 2003; and U.S. patent application Ser. No. 10/733,815, filed on Dec. 10, 2003, each of which is hereby incorporated by reference in its entirety.

BACKGROUND

A web site is a group of related web pages that are available for retrieval via the Internet or another computer network. Parties that maintain web sites are sometimes called "publishers." Some publishers sell to advertisers opportunities to include advertising messages on their web sites. For example, the publisher of a news web site may sell to an advertiser selling residential inspection services an opportunity to include advertisements on the publisher's web site.

In particular, publishers often sell opportunities to include advertising on particular pages of publishers' web sites having special significance. For example, because residential inspection services may be valuable to people who are in the market for a house, the publisher of the news web site may sell to the residential inspection services advertiser an opportunity to include advertisements on pages of the publisher's web site containing articles about real estate sales. As another example, the publisher may sell to the residential inspection services advertiser an opportunity to include advertisements on search result pages produced from user queries containing the search term "home sales."

Another advertising paradigm used by publishers—referred to here as "targeted advertising"—involves selling opportunities to present advertising messages to particular groups of people, rather than selling opportunities to present advertising messages in particular places, such as on particular web pages. Targeted advertising is conventionally performed by having publishers include on some or all of the web pages of their web sites content, such as a pixel inclusion reference, that causes web browsers loading these web pages to contact a behavioral monitoring server, providing to the behavioral monitoring server both (1) a user identifier that was earlier stored on the user's computer system by the behavioral monitoring server and uniquely identifies the user or the user's computer system to the behavioral monitoring server, and (2) information identifying the particular web page loaded, and/or an action performed by the user with respect to the loaded web page. The unique user identifier is often needed because no other basis exists for uniquely identifying certain user computer systems, such as those who access the Internet through a proxy server that obscures the user computer system's source Internet Protocol address.

Each time the behavioral monitoring server is contacted, it is able to use the user identifier to unambiguously identify the client computer system in which the specified action was performed. Further, and more seriously, accumulating behavioral information about users who are uniquely associated with particular user identifiers in the manner described above, operators of behavioral monitoring servers may cause or permit this behavioral information to be linked with specific identifying information that discloses or suggests the identity of the user whose behavior it describes. The risk of such linking tends to make users resistant to submit to behavioral monitoring, which in turn makes it more difficult for advertisers to take advantage of targeted advertising and its significant benefits.

In view of the foregoing, an approach to tracking user behavior in a manner that prevents that user behavior from being linked to information specifically identifying the user would have significant utility.

BRIEF DESCRIPTION OF THE DRAWINGS

FIGS. 2-13 are data flow diagrams illustrating the facility's maintenance of behavioral profile IDs.

DETAILED DESCRIPTION

A software facility for tracking the actions of each of a group of users without attributing user identifiers that uniquely identify each user ("the facility") is provided. Each action taken by any user in the group—such as a web-browsing action—generates a notification that both identifies this current action and contains a behavioral profile identifier ("behavioral profile ID") that identifies, based on a dictionary maintained by a profiling server, a list of actions previously performed by the user. In some embodiments, such notifications are generated by virtue of including a pixel inclusion reference on a number of publisher web pages each corresponding to a particular user action, such that the pixel inclusion reference causes an HTTP request to be sent to the profiling server, providing the identity of the action and attaching browser cookie contents that include the user's current behavioral profile ID. Because every user who has previously performed the same set of actions has the same behavioral profile ID, each behavioral profile ID can correspond to any number of users, and therefore does not uniquely identify any individual users.

When a notification is received at the server, the server determines whether a behavioral profile ID has yet been assigned to the set of actions formed by adding the current action to the behavioral profile identified by the behavioral contained in the notification. If not, the server assigns a new behavioral profile ID to this set of actions. The behavioral profile ID for this set is then returned to the user in response to the notification, and included in the next such notification from the same user. In some embodiments, the user's computer system maintains the user's current behavioral profile ID in a web browser cookie. A user's current behavioral profile ID, or information based upon it, may be used at any time to determine what actions the user has taken, and, as a result, which advertising messages are most appropriate to present to the user.

Figure 1:
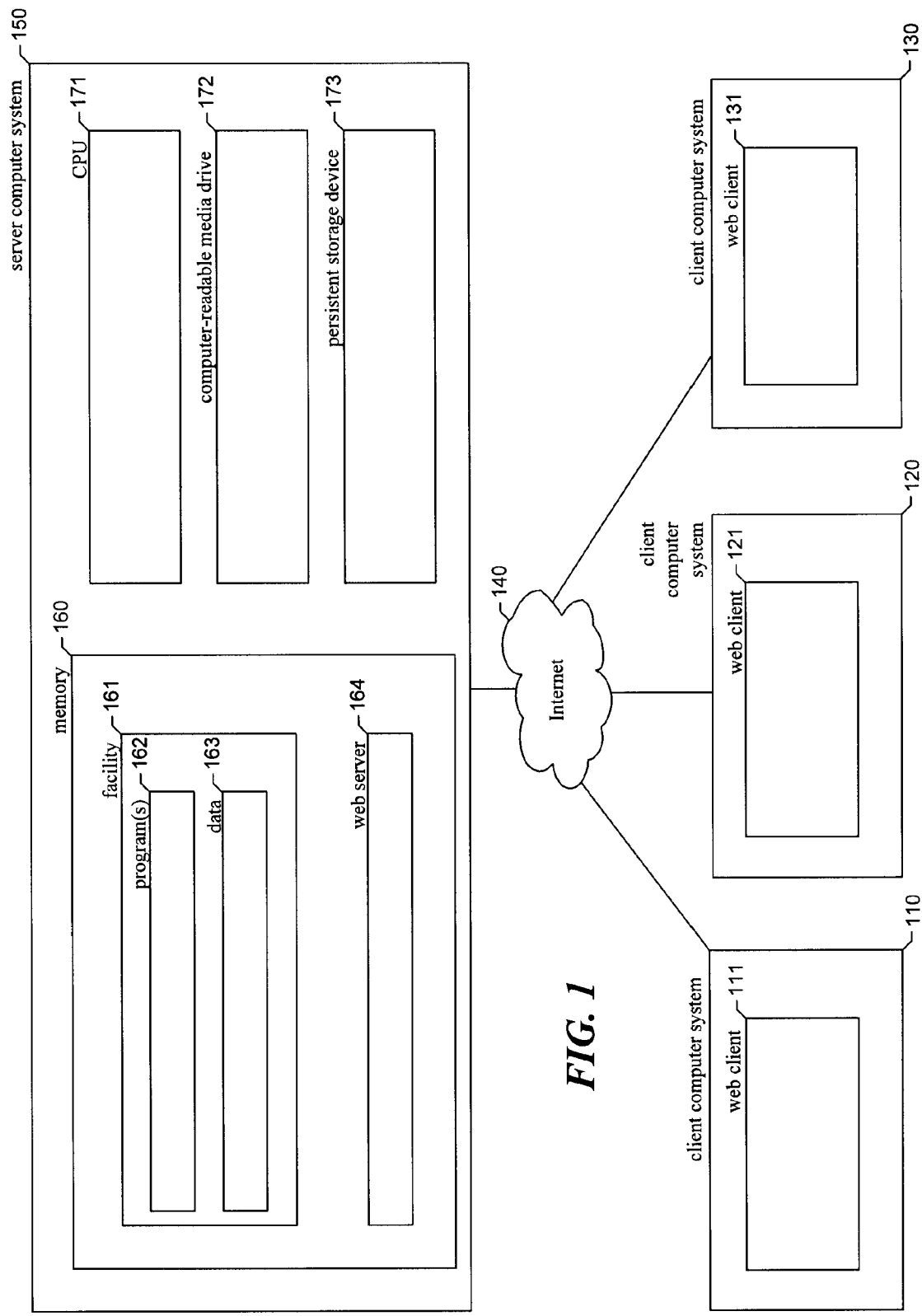
FIG. 1 is a high-level block diagram showing a typical environment in which the facility operates.

FIG. 1 is a high-level block diagram showing a typical environment in which the facility operates. The block diagram shows several client computer systems, such as client computer systems 110, 120, and 130. Each of the client computer systems has a web client computer program that a user of the client computer system can use to browse the World Wide Web, such as web clients 111, 121, and 131. Such web clients typically allow web servers within particular domains to store data in a form called a cookie on a client computer system as part of the process of responding to a request from the web client on that client computer system. Such cookies may be used to store information uniquely identifying the client computer system and/or its user, among other information. The web client forwards the information stored in a cookie with each future request it makes to the domain that created the cookie. The client computer systems are connected via the Internet 140 to a server computer system 150 hosting the facility. Those skilled in the art will recognize that client computer systems could be connected to the server computer system by networks other than the Internet, however.

The server computer system 150 contains a memory 160. The memory 160 preferably contains the facility 161, comprising one or more programs 162, as well as data 163. Data 163 typically includes a dictionary of behavioral profile IDs assigned by the facility, discussed in greater detail below. The memory preferably further contains a web server computer program 164 for delivering web pages in response to requests from web clients. While items 161-164 are preferably stored in memory while being used, those skilled in the art will appreciate that these items, or portions of them, maybe be transferred between memory and a persistent storage device 172 for purposes of memory management and data integrity. The server computer system further contains one or more central processing units (CPU) 171 for executing programs, such as programs 161-164, and a computer-readable medium drive 173 for reading information or installing programs such as the facility from computer-readable media, such as a floppy disk, a CD-ROM, or a DVD.

While various embodiments of the facility are described in terms in the environment described above, those skilled in the art will appreciate that the facility may be implemented in a variety of other environments including a single, monolithic computer system, as well as various other combinations of computer systems or similar devices connected in various ways. In particular, the facility may interact with users via a wide range of portable and/or wireless user interface devices, such as cellular telephones, pagers, personal digital assistants, etc.

FIGS. 2-13 are data flow diagrams illustrating the facility's maintenance of behavioral profile IDs. FIG. 2 shows a client 210 and the server 230. Client 210 has stored a cookie 211 containing a behavioral profile ID whose value is null. When the user of client 210 performs an action A, such as loading a particular web page, the client sends the server a request 220. Request 220 specifies the current behavioral profile ID of client 210—null—and the action performed—action A. When the server 230 receives request 220, its dictionary 240 does not contain any entries.

FIG. 3 shows the server's processing of request 220. It can be seen that the server's dictionary 340 has been updated to add a mapping from behavioral profile ID null and added action A to new behavioral profile ID 1. The server 330 sends a client 310 a response 350 specifying this new behavioral profile ID of 1.

FIG. 4 shows the client's processing of response 350. It can be seen that the client's cookie 411 now contains the behavioral profile ID 1 contained by the response. After this point, the behavioral profile ID 1 can be used to select advertising messages for presentation on client 410, as discussed in more detail below.

Figure 5:
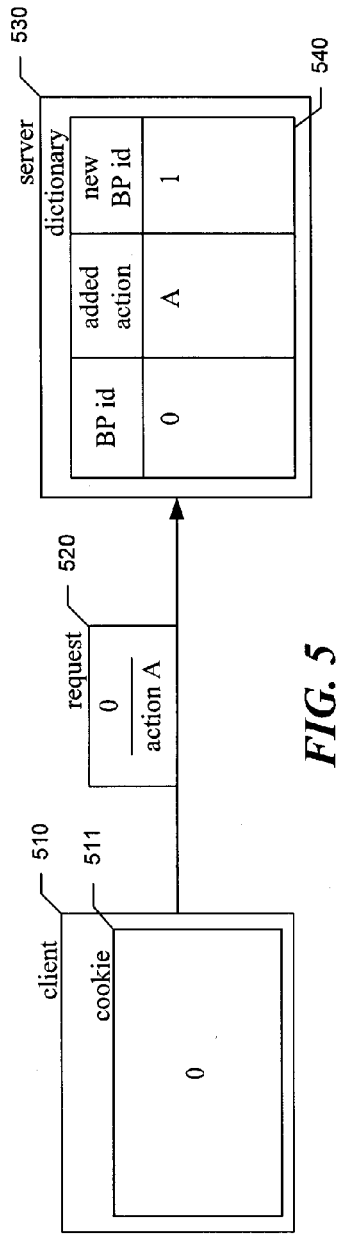
Figure 6:
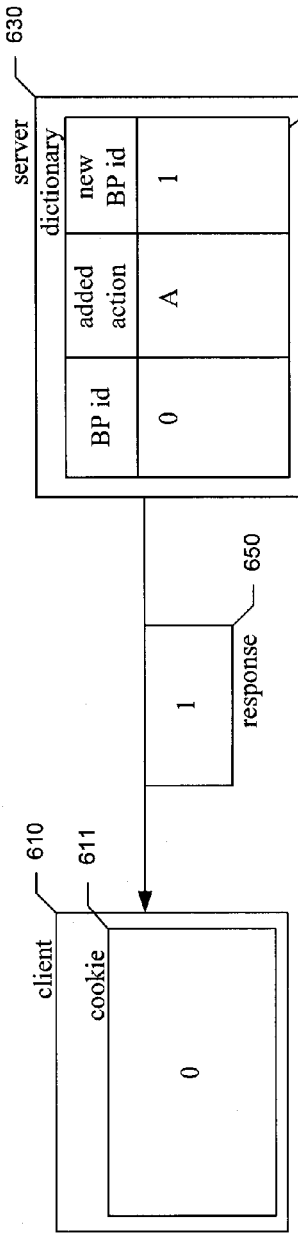
Figure 7:
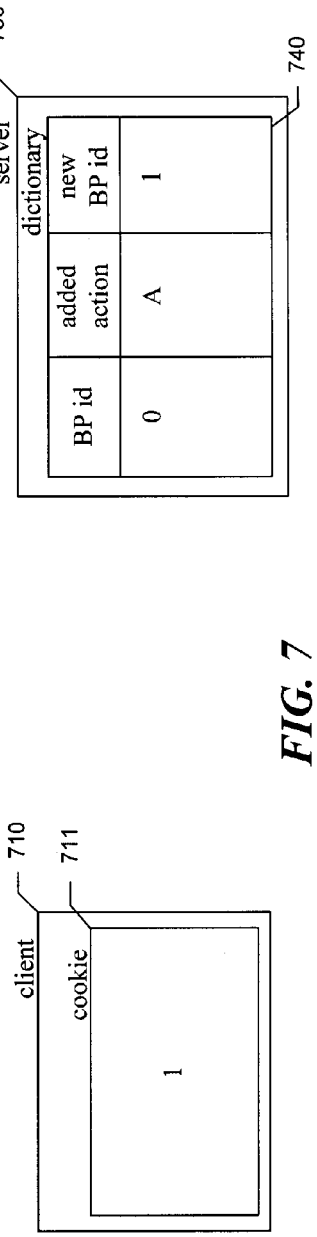

FIGS. 5-7 show the processing performed by the facility when a client submits a request like request 220 sent by client 210, after the facility has processed request 220 as discussed above in conjunction with FIGS. 2-4. FIG. 5 shows the client 510 sending request 520 matching request 220—that is, specifying a behavioral profile ID of null, and the action A. Because the server's dictionary 540 already contains a mapping from behavioral profile ID null and added action A, the server uses this existing mapping rather than creating a new mapping. FIG. 6 shows the server sending response 650 containing the new behavioral profile ID, 1, to which the existing dictionary mapping maps behavioral profile ID null and added action A. FIG. 7 shows that, here too, client 710 updates its cookie 711 to the new behavioral profile ID of 1.

Figure 8:
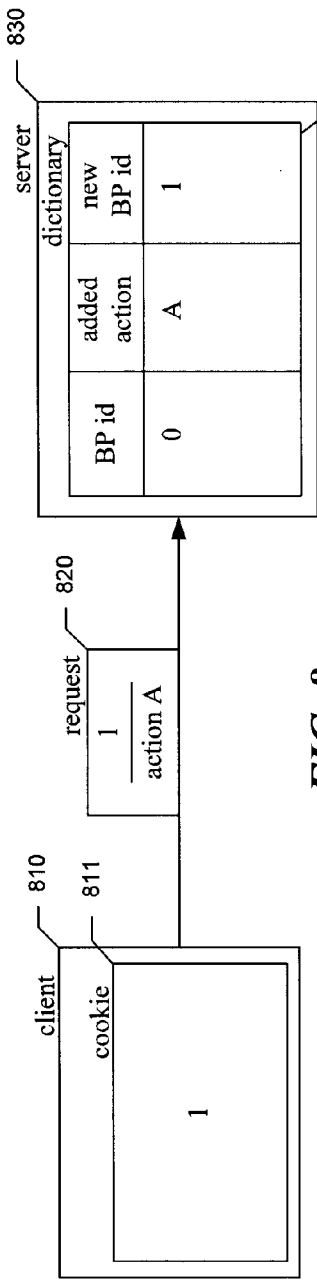
Figure 9:
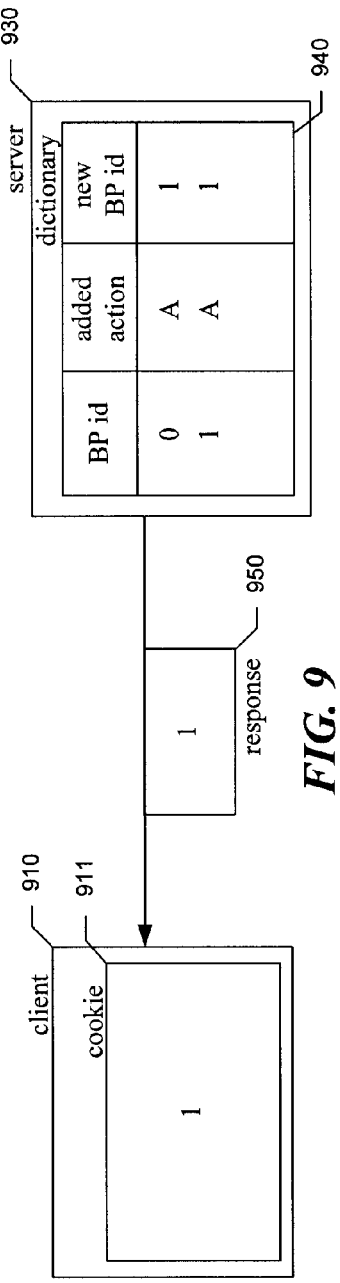
Figure 10:
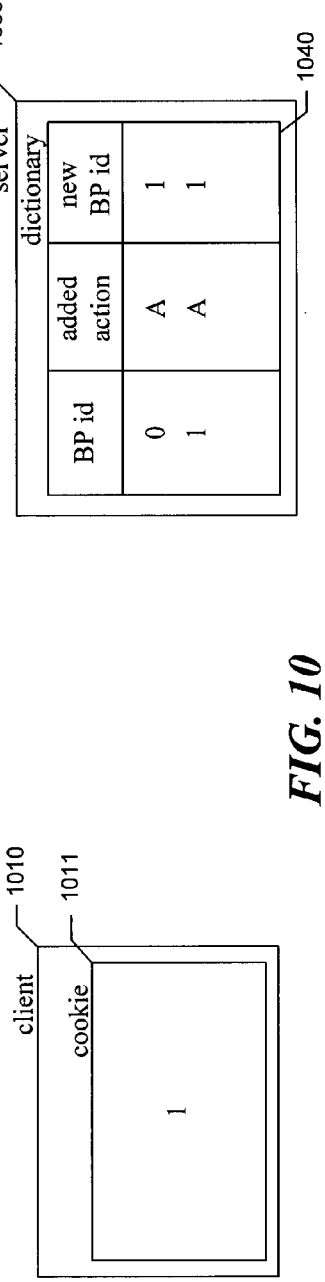

FIGS. 8-10 show the processing performed by the facility when a client having behavioral profile ID 1 submits another request specifying action A. FIG. 8 shows the client 810 having cookie 811 containing the behavioral profile ID sending a request 820 specifying that behavioral profile ID and the action A at a time after the processing shown in FIGS. 2-4 has been performed. The dictionary 840 does not contain a mapping from paper profile ID 1 and added action A. FIG. 9 shows that, accordingly, the facility adds a new mapping to dictionary 940 from behavioral profile ID 1 and added action A to behavioral profile ID 1, and sends a response 950 containing the behavioral profile ID 1. FIG. 10 shows that, in response to receiving response 950, the facility does not change the behavioral profile ID of one stored in cookie 1011.

Those skilled in the art will appreciate that the processing shown in FIGS. 8-10 is consistent with an approach of ignoring a user's performance of a particular action more than once. In some embodiments, the facility does differentiate between users who have performed exactly the same group of actions, but performed at least one of those actions a different number of times. Additionally, in some embodiments, the facility ignores differences in action order by assigning the same behavioral profile to two different users who performed the same set of actions in a different order, while in other embodiments, the facility differentiates between such users by assigning them two different behavioral profiles.

FIGS. 11-13 show the processing performed by the facility and response to a request specifying another action, B. The client 1110, whose cookie contains the behavioral profile ID 1, sends a request 1122 to server 1130. The request specifies the behavioral profile ID of 1 and action B. It can be seen that the server's dictionary 1140 does not contain a mapping for this request. FIG. 12 shows that, accordingly, the server adds a new mapping to dictionary 1240 for this request, and sends a response 1250 containing the new behavioral profile ID of 2 specified in the new mapping. FIG. 13 shows that, in response to receiving a response 1250, the client changes the value of its cookie 1311 to the new behavioral profile ID of 2. After this point, the behavioral profile ID 2 can be used to select advertising messages for presentation on client 1310.

It is impossible for the server to determine which client sent request 1120 based upon the behavioral ID and action. As best the server can determine, the request that sent request 1120 is one that earlier sent requests that caused it to have a behavioral profile ID of 1. It might be typical for 5000 different clients to have earlier sent requests that caused it to have a behavioral profile of 1, and it would be impossible for the server to distinguish which of these 5000 clients sent request 1120. Additionally, other programs, computer systems, or actors of other types reading cookie 1111—such as programs, computer systems, or actors using the behavioral profile ID stored in cookie 1111 to select an advertising message for client 1110, as well as unauthorized interlopers reading cookie 1111—would similarly the unable to distinguish client 1110 and its user from any of the other 4999 clients and their users.

Accordingly, while it might sometimes be true that a particular behavioral profile ID is contained by only one client, the server has no way of telling that this condition exists. Further, such a client might later take an action that caused its behavioral profile ID to be changed to a behavioral profile ID shared by one or more other clients, at which point this condition would no longer exist.

In some embodiments, the facility permits its operator to adjust one or more of a number of different variables that affect the relative level of uniqueness of the behavioral profile IDs produced by the facility. These include: (1) the granularity of actions tracked by the facility; where actions are defined narrowly, to include hundreds or thousands of different actions, behavioral profiles and their identifiers become more unique, while where actions are defined broadly to reduce the total number of different actions, behavioral profiles and their identifiers become more common and less unique; (2) action order: where behavioral profiles and their identifiers are differentiated on the basis of the order in which actions are performed, behavioral profiles and their identifiers become more unique; where they are not, they become less unique; and (3) action repetition: where behavioral profiles and their identifiers are differentiated on the basis of the number of times a user performed a particular action, behavioral profiles and their identifiers become more unique; when they are not, they become less unique. By adjusting these variables, an operator of the facility can exert a certain amount of control over the relative level of uniqueness of behavioral profiles and behavioral profile IDs.

Figure 14:
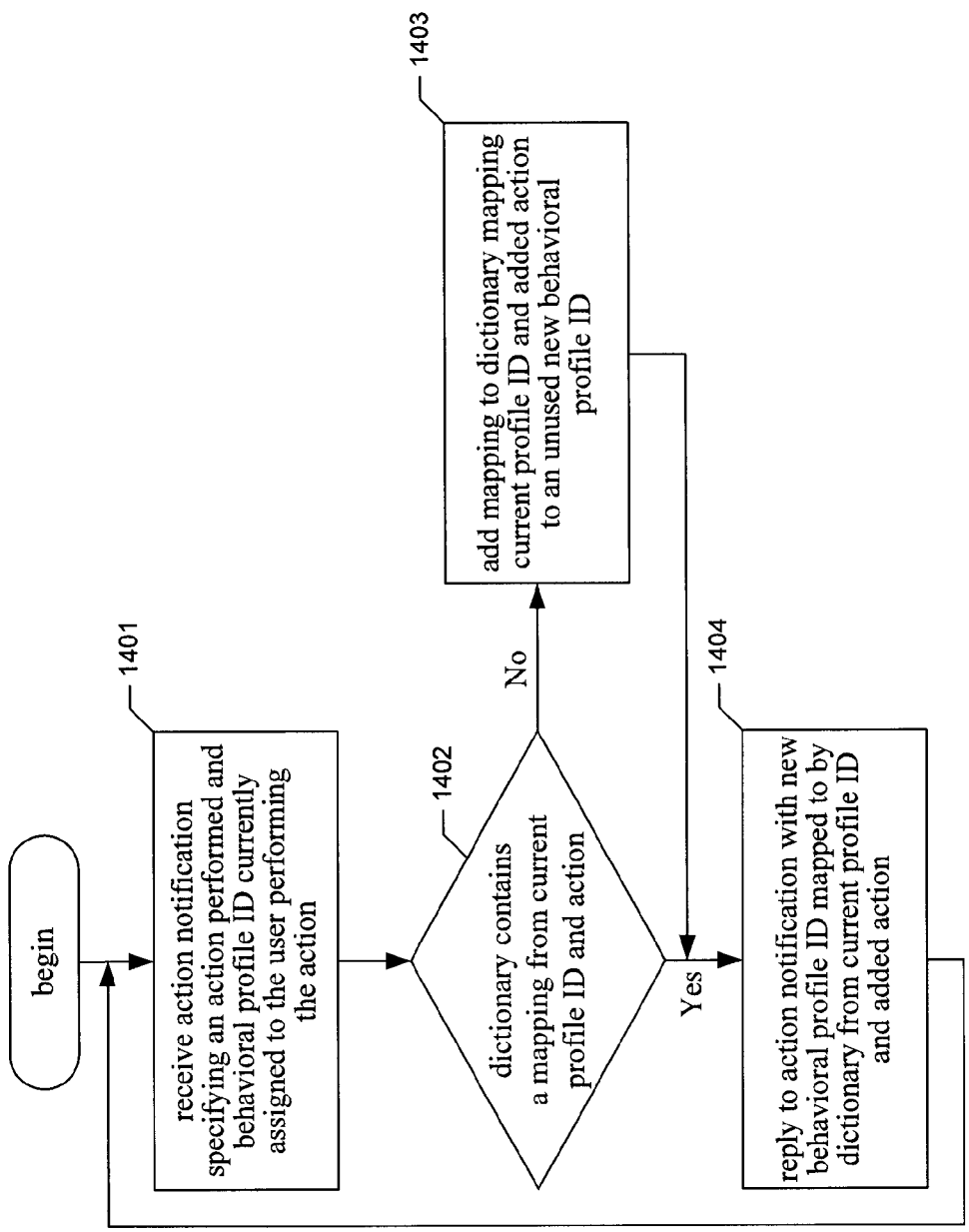
FIG. 14 is a flow diagram showing steps typically performed by the facility in the profiling server.

FIG. 14 is a flow diagram showing steps typically performed by the facility in the profiling server. In step 1401, the facility receives an action notification from a client computer system, such as an HTTP request from the client computer system. The received action notification specifies an action performed on the client computer system, and the behavioral profile ID currently stored in the user computer system to identify the set of actions previously performed on the user computer system. In step 1402, if the dictionary maintained by the facility contains a mapping from the current profile ID and action specified in the action notification received in step 1401, then the facility continues in step 1404, else the facility continues in step 1403. In step 1403, the facility adds a new mapping to its dictionary. The new mapping maps the current profile ID and added action specified in the received action notification to a behavioral profile ID that is unused, i.e., that does not presently exist in the new behavioral profile ID column of the dictionary. After step 1403, the facility continues in step 1404.

In step 1404, the facility replies to the action notification with the new behavioral profile ID mapped to by the dictionary from the current profile ID and added action specified by the received action notification, such as by sending an HTTP response. After step 1404, the facility continues in step 1401 to receive the next action notification.

In some embodiments, the facility periodically or continuously publishes the contents of its dictionary to enable other computer systems under the control of the operator of the facility, or under the control of others, to decode the behavioral profile IDs stored on user computer systems into the set of actions performed by the user, and select an appropriate targeted advertising message. In some embodiments, the facility provides an interface for requesting the decoding of individual behavioral profile IDs. In these embodiments, the facility receives at the interface decoding requests that each specify a behavioral profile IDs, and replies with the set of actions to which the behavioral profile ID corresponds. In other embodiments, as part of step 1404 (not shown), the facility in the profiling server uses the new behavioral profile ID being returned to the user computer system to itself make a determination about how advertising should be targeted to the user computer system, such as by including specifications of one or more of the following in the reply to the action notification which will be stored on the user computer system together with the behavioral profile ID: identifiers individually identifying advertising messages to present to this user; identifiers identifying groups of advertising messages to present to this user; identifiers identifying advertising campaigns to be presented to this user; identifiers identifying user segments to which this user belongs; etc. Those skilled in the art will appreciate that a variety of well-known techniques are available for deriving such identifiers from a user's behavioral profile. After being stored on the user's computer system together with the new behavioral profile ID, this derived information may be used to select advertising messages to present to this user.

As an example of targeting, a particular advertising message may be selected for presentation to users whose behavioral profile IDs indicate that they have performed actions A and C. As another example, an advertising message may be selected for presentation to users whose behavioral profile IDs indicate that they have either (1) performed action A and not action B or (2) performed action C.

In some embodiments, the facility performs various kinds of maintenance on its dictionary. For example, in some embodiments, the facility selects a particular action whose performance is no longer interesting and "collapses" the dictionary over that action, so that users who have not performed that action are not differentiated from users who have performed that action solely on that basis. Different embodiments of the facility utilize various approaches to perform such collapsing, including adding new mappings to the dictionary and/or modifying existing mappings to assign the same behavioral profile ID to sets of actions whose only difference is the performance of the action to be collapsed. In this way, the facility enables its operator to maintain the pertinence to current advertising goals of the behavioral profile IDs assigned in accordance with its dictionary.

It will be appreciated by those skilled in the art that the above-described facility may be straightforwardly adapted or extended in various ways. For example, the facility may be used to profile a wide variety of different types of actions. While the foregoing description makes reference to preferred embodiments, the scope of the invention is defined solely by the claims that follow and the elements recited therein.

I claim:

1. A computing system for tracking user actions performed using particular client computer systems in a server computer system, comprising:

means for receiving an action notification specifying both (1) an action performed using the client computer system and (2) a behavioral profile ID stored in the client computer system;

means for determining whether a dictionary accessible to the server computer system contains a mapping from (1) the specified behavioral profile ID and (2) the specified action to a resulting behavioral profile ID, wherein the dictionary includes a plurality behavioral profile IDs that each correspond to a set of one or more actions, and wherein a selected one of the plurality of behavioral profile IDs included by the dictionary is stored by at least two client computer systems;

means for, if the dictionary does not contain a mapping from (1) the specified behavioral profile ID and (2) the specified action to a resulting behavioral profile ID:

generating a new behavioral profile ID, and
adding to the dictionary a mapping from (1) the specified behavioral profile ID and (2) the specified action to the generated behavioral profile ID; and
means for replying to the action notification with an instruction to the client computer system that originated the action notification to store the resulting behavioral profile ID that the dictionary maps to from (1) the specified behavioral profile ID and (2) the specified action in place of the behavioral profile ID currently stored in the client computer system.

2. The computing system of claim 1 wherein the instruction specifies storing the resulting behavioral profile ID that the dictionary maps to from (1) the specified behavioral profile ID and (2) the specified action to in place of the behavioral profile ID as a web browser cookie in the client computer system.

3. The computing system of claim 1, further comprising:
means for consolidating the mappings in the dictionary to merge any behavioral profile IDs whose sets of actions differ only by the inclusion or exclusion of a selected event.

4. The computing system of claim 1, further comprising:
means for selecting an advertising message to be presented on a particular client computer system based upon the set of actions represented by the behavioral profile ID stored on the particular client computer system.

5. The computing system of claim 1, further comprising:
means for selecting an advertising message to be presented on a particular client computer system based upon the set of actions represented by the behavioral profile ID stored on the particular client computer system complying with an action specification specified for the selected advertising message.

6. The computing system of claim 1 wherein it is impossible to determine in the server computer system the number of client computer systems on which a particular behavioral profile ID is stored.

7. The computing system of claim 1 wherein, for each behavioral profile ID, it is impossible to determine in the server computer system from the behavioral profile ID the number of client computer systems on which the behavioral profile ID is stored.

8. The computing system of claim 1, further comprising:
means for receiving user input specifying a level of granularity with which actions are to be specified in the action notifications received by the server computer system.

9. The computing system of claim 1 wherein a first behavioral profile ID corresponds to a first ordering of a first set of actions and wherein a second behavioral profile ID corresponds to a second ordering of the first the set of actions, the first ordering being different from the second ordering.

10. The computing system of claim 1 wherein the set of actions are unordered.

11. A computer-readable memory storing instructions that, if executed by a computing system having a memory and a processor, cause the computing system to perform a method for tracking user actions performed using particular client computer systems in a server computer system, the method comprising:
receiving an action notification specifying both (1) an action performed using the client computer system and (2) a behavioral profile ID stored in the client computer system;
determining whether a dictionary accessible to the server computer system contains a mapping from (1) the specified behavioral profile ID and (2) the specified action to a resulting behavioral profile ID, wherein the dictionary includes a plurality behavioral profile IDs that each correspond to a set of one or more actions, and wherein a selected one of the plurality of behavioral profile IDs included by the dictionary is stored by at least two client computer systems;
if the dictionary does not contain a mapping from (1) the specified behavioral profile ID and (2) the specified action to a resulting behavioral profile ID:
generating a new behavioral profile ID, and
adding to the dictionary a mapping from (1) the specified behavioral profile ID and (2) the specified action to the generated behavioral profile ID; and
replying to the action notification with an instruction to the client computer system that originated the action notification to store in place of the behavioral profile ID currently stored in the client computer system the resulting behavioral profile ID that the dictionary maps to from (1) the specified behavioral profile ID and (2) the specified action.

12. The computer-readable memory of claim 11 wherein the instruction to the client computer system that originated the action notification specifies storing the resulting behavioral profile ID that the dictionary maps to from (1) the specified behavioral profile ID and (2) the specified action to in place of the behavioral profile ID as a web browser cookie in the client computer system.

13. The computer-readable memory of claim 11, the method further comprising:
selecting an advertising message to be presented on a particular client computer system based upon the set of actions represented by the behavioral profile ID stored on the particular client computer system.

14. The computer-readable memory of claim 11, the method further comprising:
selecting an advertising message to be presented on a particular client computer system based upon the set of actions represented by the behavioral profile ID stored on the particular client computer system complying with an action specification specified for the selected advertising message.

15. The computer-readable memory of claim 11 wherein a first behavioral profile ID corresponds to a first ordering of a first set of actions and wherein a second behavioral profile ID corresponds to a second ordering of the first the set of actions, the first ordering being different from the second ordering.

16. The computer-readable memory of claim 11 wherein the set of actions are unordered.

17. A method for tracking user actions performed using particular client computer systems in a server computer system, the method comprising:
receiving an action notification specifying both (1) an action performed using the client computer system and (2) a behavioral profile ID stored in the client computer system;
determining whether a dictionary accessible to the server computer system contains a mapping from (1) the specified behavioral profile ID and (2) the specified action to a resulting behavioral profile ID, wherein the dictionary includes a plurality behavioral profile IDs that each correspond to a set of one or more actions, and wherein a selected one of the plurality of behavioral profile IDs included by the dictionary is stored by at least two client computer systems;
if the dictionary does not contain a mapping from (1) the specified behavioral profile ID and (2) the specified action to a resulting behavioral profile ID:

generating a new behavioral profile ID, and adding to the dictionary a mapping from (1) the specified behavioral profile ID and (2) the specified action to the generated behavioral profile ID; and replying to the action notification with an instruction to the client computer system that originated the action notification to store in place of the behavioral profile ID currently stored in the client computer system the resulting behavioral profile ID that the dictionary maps to from (1) the specified behavioral profile ID and (2) the specified action.

18. The method of claim 17, further comprising:

selecting an advertising message to be presented on a particular client computer system based upon the set of actions represented by the behavioral profile ID stored on the particular client computer system.

19. The method of claim 17, further comprising:

selecting an advertising message to be presented on a particular client computer system based upon the set of actions represented by the behavioral profile ID stored on the particular client computer system complying with an action specification specified for the selected advertising message.

20. The method of claim 17 wherein a first behavioral profile ID corresponds to a first ordering of a first set of actions and wherein a second behavioral profile ID corresponds to a second ordering of the first the set of actions, the first ordering being different from the second ordering.

\* \* \* \* \*